G. A. ROSSITER.
MERIDIAN FINDER AND LATITUDE INDICATOR.
APPLICATION FILED APR. 17, 1913.
1,226,385.
Patented May 15, 1917.
3 SHEETS—SHEET 1.
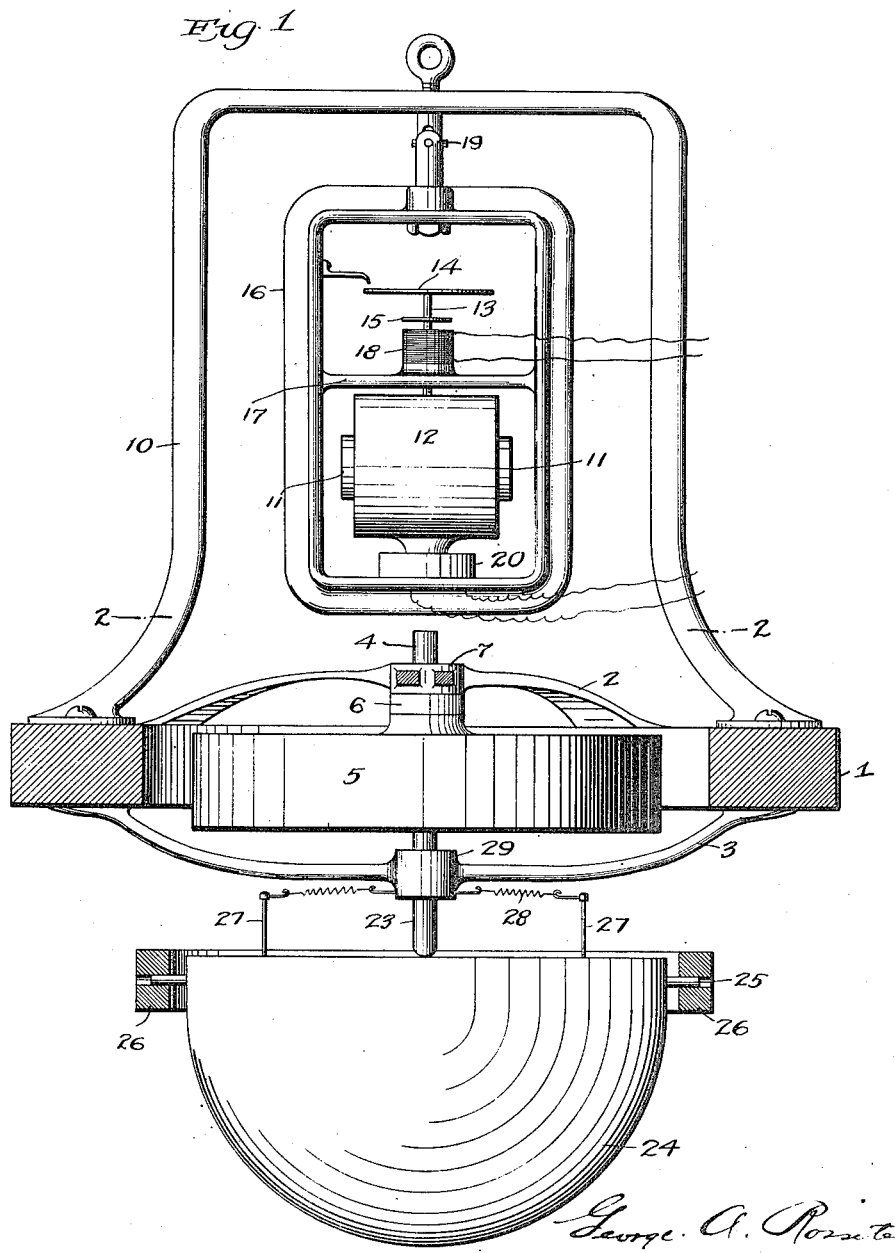
WITNESSES
INVENTOR
George A. Rossiter
BY
ATTORNEY G. A. ROSSITER.
MERIDIAN FINDER AND LATITUDE INDICATOR.
APPLICATION FILED APR. 17, 1913.
1,226,385.
Patented May 15, 1917.
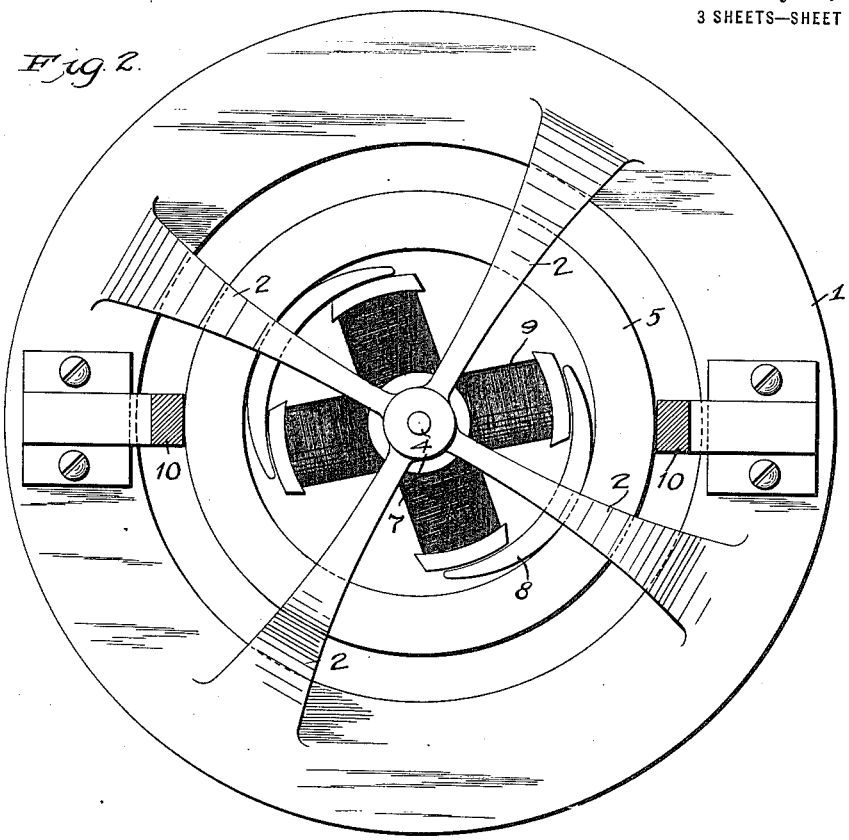
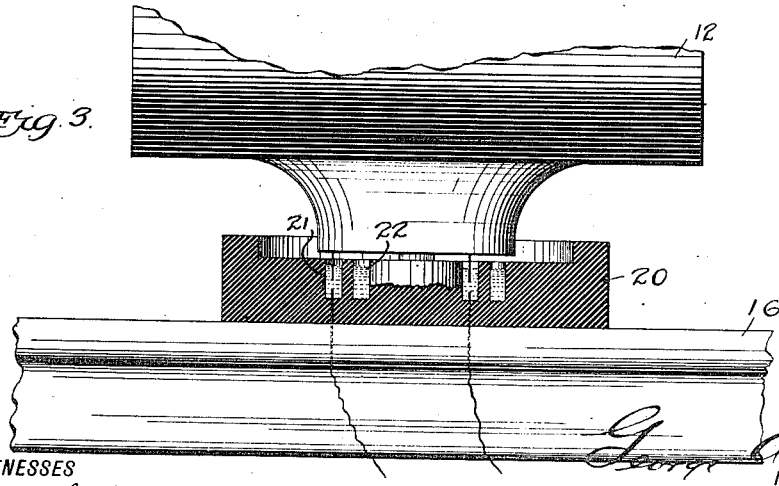

G. A. ROSSITER.
MERIDIAN FINDER AND LATITUDE INDICATOR.
APPLICATION FILED APR. 17, 1913.
1,226,385.
Patented May 15, 1917.
3 SHEETS—SHEET 3.
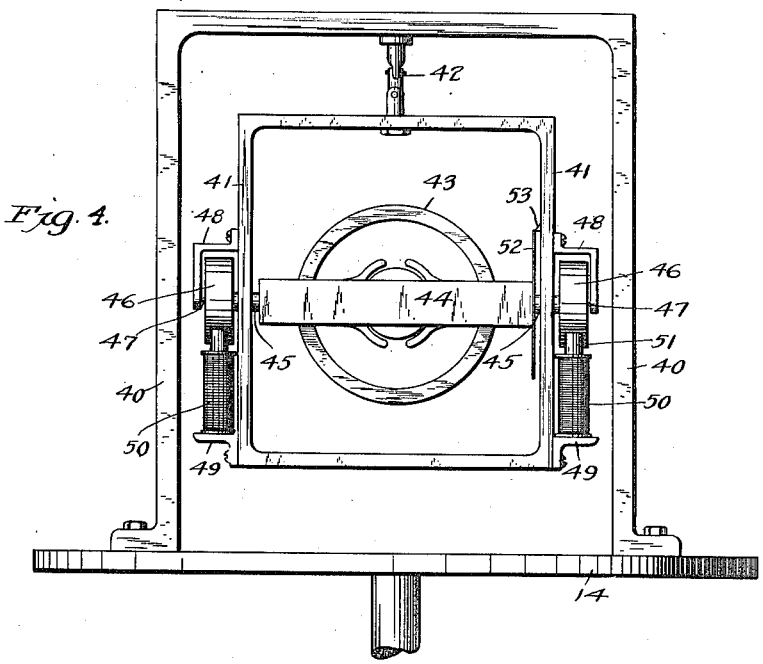
Fig. 4.
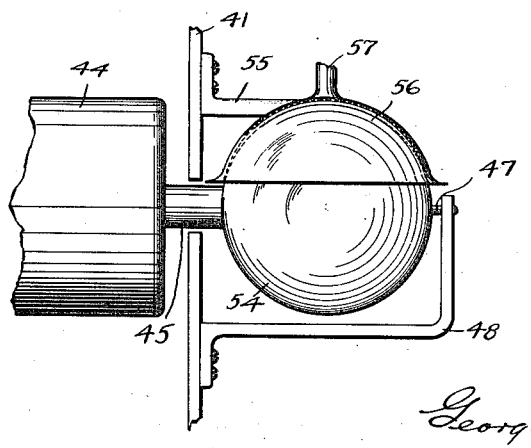
Fig. 5.
WITNESSES
George A. Rossiter
INVENTOR
ATTORNEY

UNITED STATES PATENT OFFICE.

GEORGE A. ROSSITER, OF BROOKLYN, NEW YORK, ASSIGNOR TO FRANK G. CARRIE, OF NEW YORK, N. Y.

MERIDIAN-FINDER AND LATITUDE-INDICATOR.

1,226,385. Specification of Letters Patent. Patented May 15, 1917.

Application filed April 17, 1913. Serial No. 761,668.

*To all whom it may concern:*

Be it known that I, GEORGE A. ROSSITER, a citizen of the United States, and a resident of Brooklyn, Kings county, New York, have invented a new and useful Meridian-Finder and Latitude-Indicator, of which the following is a specification.

My invention relates to a device that may be used as a meridian finder and latitude indicator in which a heavy rotating mass is so mounted as to secure freedom of motion. To secure accuracy of reading in an apparatus of this nature it is necessary to attain a high speed in the rotation of the heavy masses and also to minimize the friction in the supporting bearings.

In the form of my invention shown herewith, the rotating mass is supported in frames and if it is perfectly adjusted will automatically adjust itself with its axis parallel to the earth's axis.

As shown, the reading disk is mounted in one frame having a universal connection with another frame mounted in turn upon the frame of a secondary heavy revolving mass in such a way as to remain essentially in the same plane, said secondary revolving mass being secured to a shaft running upon a hardened surface constituting the upper face of a heavy mass carried on pivots in double gimbal rings which can be suitably mounted on the deck or bridge of a vessel.

The object of the secondary revolving mass is apparent. To secure accurate readings on the meridian finding disk and latitude indicator, it is essential that the apparatus should maintain a perfect horizon under any and all conditions and with my method of construction, the secondary revolving mass will automatically retain a horizontal position by reason of the rotation of the mass and the method of mounting same in the gimbal rings.

Further advantages will be brought out in the following specification and illustrated in the drawings herewith.

Figure 1 is a side elevation of my device.

Fig. 2 is a sectional view on the line 2—2 of Fig. 1.

Fig. 3 is an enlarged partial section illustrating the method of electrical connection.

Fig. 4 is an elevation of the latitude indicating mechanism.

Fig. 5 is a view of a friction reducing means.

In the drawing is shown a ring 1 with upper and lower arms 2 and 3 whereby it is mounted on the axle 4, of a heavy revolving mass 5 with bearings 6 interposed between a hub on the revolving mass and another hub 7 on the arms 2.

The revolving mass 5 is constructed in the usual way, and as shown in Fig. 2 consists of field pieces 8 and armature coils 9 suitably mounted. The electrical connection shown is direct as the armature is stationary, and the leads may be taken directly thereto.

Upon the said ring 1 a suitable frame 10 of sufficient strength and rigidity is mounted, said frame being adapted to carry the primary revolving mass and its casing and frame. The primary revolving mass is of the usual form of electrically driven disks, and is mounted in the casing 12, having secured theerto the vertical stem 13, which carries the reading disk 14 and also the copper disk 15, the object of which will presently be described. In a frame 16 I provide a cross bearing plate 17 upon which is mounted a coil 18, wound hollow, the stem 13, passing through the opening in the coil 18. If, then, an alternating current be passed through the coil 18, the disk 15 will be repelled from the coil 18 owing to the equal polarity set up in the disk 15. As the casing 12 has at its lower extremity a pivot bearing the weight of the casing and of the revolving mass therein, there would be considerable friction which can be reduced to a practical zero by sending an electrical current of sufficient strength through the coil 18. The advantage of this is obvious.

The frame 16 carries the primary revolving mass and its appurtenances and is given a freedom of movement by being suspended from the main frame 10 by a universal joint 19.

The casing 12 and its appurtenances will move at times, with relation to the carrying frame 16, owing to the fact that the primary revolving mass seeks a plane of least resistance and to allow for such relative movement I employ the form of conduction illustrated in Fig. 3. This consists of a disk 20, of insulating material with two annular grooves 21 and 22 filled with mercury or some other good conductor with the leads from the motor depending therein and the leads from the source of the current being sealed in the said disk 20.

To compensate for the motion of the vessel carrying this apparatus, I provide that the axle 23 of the secondary revolving mass shall rotate on the upper surface of the heavy mass 24 pivotally mounted at 25 in gimbal rings 26—26 which in their turn can be pivotally mounted on a suitable frame work (not shown).

To maintain a center for the axle 23 on the upper surface of the mass 24 and to take care of the reaction between the armature and field, uprights 27 are secured to the mass 24 and are connected by springs 28 to the lower hub 29 on the arms 3.

As shown in Fig. 4, when this apparatus is used as a latitude finder, a frame work 40 is mounted on the reading disk 14, and a secondary frame 41 is suspended therein on a universal joint 42, secured to the said frame 40 and the secondary frame 41. Mounted in said frame 41 is a heavy revolving mass 43 carried in a suitable structure 44 fitted with trunnions 45, having at their ends, disks and pivots 47 journaled in bearings 48 fastened to the frame 41. These pivots 47 are not adapted to carry the weight of the mass 43 the structure 44 and the disks 46—46 but act merely as steadying pivots.

On the brackets 49 on the frame 41 are the magnetic coils 50 having cores 51 and suitable connections to a source of alternating electric current. If such a current of sufficient strength be sent through the coils 50 a condition will be set up between the cores 51 and the disks 46 whereby the combined weight of the disks 46, the structure 44 and the mass 43, will be exactly balanced. A reading disk 52 is mounted on the structure 44 and an indicator 53, coöperating with said reading disk is secured on the frame 41.

In Fig. 5 of the drawings I show another form of friction reducing means. In this form spheres 54 are mounted on the trunnions 45. On the frame 41, brackets 55 carry hollow cups 56 having slightly larger radii than the spheres 54 and having a connection through the pipe 57 to a source of vacuum. By this means the combined weight of the structure 44, the heavy mass 43 and the spheres 54 can be carried by the air rushing into the cups 56. It is obvious that by reversing the structure shown in Fig. 5, compressed air could be utilized instead of the vacuum producing means with the same result.

I claim:

1. In an apparatus of the class described the combination of a frame; a vertically disposed shaft connected to said frame; a mass mounted to rotate in said frame on said shaft; a second frame mounted on said first frame; a second mass adapted to rotate on a vertical axis in said second frame; a third mass for supporting said frames and first and second masses and on which said vertical shaft pivots; and means for pivotally suspending said third mass, substantially as described.

2. In an apparatus of the class described, the combination of a frame; a vertically disposed shaft connected to said frame; a mass mounted to rotate in said frame on said shaft; a second frame mounted on said first frame; a second mass adapted to rotate on a horizontal axis; a third frame pivoted on a vertical axis in said second frame for supporting said second mass; a third mass for supporting said frames and first and second masses and on which said vertical shaft pivots; and means for pivotally suspending said third mass, substantially as described.

3. In an apparatus of the class described the combination of a frame; a vertically disposed shaft connected to said frame; a mass mounted to rotate in said frame on said shaft; a second frame mounted on said first frame; a second mass adapted to rotate on a horizontal axis in said second frame; a third mass for supporting said frames and first and second masses, on which said vertical shaft pivots; spring connections between said shaft and said third mass; and means comprising gimbal rings for pivotally suspending said third mass, substantially as described.

4. In an apparatus of the class described the combination of a frame; a vertically disposed shaft connected to said frame; a mass mounted to rotate in said frame on said shaft; a second frame mounted on said first frame; a second mass adapted to rotate in said second frame; a rotating disk located within said second frame; latitude indicating means mounted on said rotating disk within said second frame; means to which said disk is rigidly connected for pivotally suspending said second mass in said second frame; a third mass for supporting said frames and first and second masses, on which said vertical shaft pivots; and means for pivotally suspending said third mass, substantially as described.

In witness whereof, I have hereunto set my hand this 19th day of March, 1913.

GEORGE A. ROSSITER.

Witnesses:
JULIUS W. MANNEBACH,
ANTHONY F. ARCOME.